US 8,074,160 B2

(12) United States Patent
Fry et al.

(10) Patent No.: US 8,074,160 B2
(45) Date of Patent: Dec. 6, 2011

(54) STREAMING PARSER API FOR PROCESSING XML DOCUMENT

(75) Inventors: Chris Fry, Berkely, CA (US); Sam Pullara, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1081 days.

(21) Appl. No.: 11/228,593

(22) Filed: Sep. 16, 2005

(65) Prior Publication Data

US 2006/0020951 A1    Jan. 26, 2006

(51) Int. Cl.
G06F 17/27    (2006.01)

(52) U.S. Cl. ........................................ 715/200

(58) Field of Classification Search ............... 719/328; 715/200
See application file for complete search history.

(56) References Cited

U.S. PATENT DOCUMENTS

| | | | |
|---|---|---|---|
| 6,125,391 A | 9/2000 | Meltzer et al. | 709/223 |
| 6,226,675 B1 | 5/2001 | Meltzer et al. | 709/223 |
| 6,438,744 B2 | 8/2002 | Toutonghi et al. | |
| 6,453,464 B1 * | 9/2002 | Sullivan | 717/137 |
| 6,519,617 B1 | 2/2003 | Wanderski et al. | 715/513 |
| 6,621,505 B1 | 9/2003 | Beauchamp et al. | |
| 6,662,342 B1 * | 12/2003 | Marcy | 715/227 |
| 6,901,410 B2 | 5/2005 | Marron et al. | 707/104.1 |
| 6,925,631 B2 | 8/2005 | Golden | |
| 6,941,557 B1 | 9/2005 | Jakobson et al. | |
| 7,065,579 B2 | 6/2006 | Traversat et al. | |
| 7,072,985 B1 | 7/2006 | Lev-Ami et al. | |
| 2001/0047385 A1 | 11/2001 | Tuatini | |
| 2001/0054172 A1 | 12/2001 | Tuatini | |
| 2002/0120704 A1 | 8/2002 | Karp et al. | |
| 2002/0143815 A1 | 10/2002 | Sather et al. | |
| 2003/0018832 A1 | 1/2003 | Amirisetty et al. | |
| 2003/0023628 A1 * | 1/2003 | Girardot et al. | 707/513 |
| 2003/0217094 A1 | 11/2003 | Andrews et al. | |
| 2004/0019589 A1 * | 1/2004 | Basrur | 707/3 |
| 2004/0028212 A1 | 2/2004 | Lok et al. | |
| 2004/0034830 A1 * | 2/2004 | Fuchs et al. | 715/501.1 |
| 2004/0068487 A1 * | 4/2004 | Barton et al. | 707/3 |
| 2004/0103373 A1 | 5/2004 | Wei | |
| 2005/0234844 A1 * | 10/2005 | Ivanov | 707/1 |

OTHER PUBLICATIONS

Cover, Early Access Release of Java Architecture for XML Binding (JAXB), Jun. 14, 2001, p. 1-2.
Jeckle, "DaimlerChrysler", Jun. 28, 2001, pp. 1-44.
Cerami, "Web Services Essentials", 2001, pp. 1-32.
Curley "Converting Java and CORBA Components to a WS Reprentation", Feb 6, 2002, pp. 1-12.
Desai et al., "Introduction to Sequential XPath," XML Conference & Exposition 2001, Dec. 9-14, 2001.
"What is server-side" Archived Dec. 1, 2002; retrieved from <http://web.archive.org/web20021201184619>, <http://www.webopedia.com/TERM/s/server_side.html>, 2 pages.

(Continued)

Primary Examiner — Laurie Ries
Assistant Examiner — Tionna Smith
(74) Attorney, Agent, or Firm — Fliesler Meyer LLP

(57) ABSTRACT

A streaming parser API expands a base parser by building an iterative method on top of the base parser. The iterative method allows a user to pass a selected element type to the base parser, which can step through the XML document until it locates a matching element. The base parser can then extract the element, process the element as an event, and place the event on an event stream for use by an application.

11 Claims, 2 Drawing Sheets

OTHER PUBLICATIONS

"Dedicated Server Glossary" Archived Dec. 15, 2001; retrieved from <http://web.archive.org/web/20011215113007> <http://www.webserverlist.com/guides/glossary.asp>, 9 pages.

Almaer, "XML Data Binding with Castor," Oct. 24, 2001, pp. 1-5.

Desai, A., "Introduction to Sequential XPath," XML Conference & Exposition 2002, Dec. 9-14, 2001, pp. 1-10.

Abraham, Samuel, "Java Architecture for XML Binding", TopXML: XML Code Library, Feb. 11, 2002, pp. 1-4.

Cover Pages Hosted by Oasis, "Sun Microsystems Announces Java Architecture for XML Binding Beta Implementation", Oct. 24, 2002, pp. 1-5.

* cited by examiner

STREAMING PARSER API FOR PROCESSING XML DOCUMENT

CLAIM OF PRIORITY

This application claims priority to U.S. Provisional Patent Application No. 60/362,773, filed Mar. 8, 2002, entitled "STREAMING PARSER API", which is hereby incorporated herein by reference.

CROSS-REFERENCED CASES

The following applications are cross-referenced and incorporated herein by reference:

U.S. patent application Ser. No. 10/304,353 entitled "System and Method for XML Data Binding" by Chris Fry and Scott Ziegler, filed Nov. 26, 2002.

U.S. patent application Ser. No. 10/304,233 entitled "System and Method for Fast XSL Transformation" by Chris Fry, filed Nov. 26, 2002.

U.S. patent application Ser. No. 10/304,280 entitled "System and Method for XML Parsing" by Chris Fry, filed Nov. 26, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

TECHNICAL FIELD

The invention relates generally to a system and method for processing XML documents.

BACKGROUND

The eXtensible Markup Language, otherwise known as XML, has become a standard for inter-application communication. XML messages passing between applications contain tags with self-describing text. The self-describing text allows these messages to be understandable not only to the applications, but also to humans reading an XML document. XML is currently used to define standards for exchanging information in various industries. These document standards are available in various forms.

Several XML-based communication protocols exist, such as the Simple Object Access Protocol (SOAP) and the ebXML protocol. The ebXML protocol is an open XML-based infrastructure that enables the global use of electronic business information. SOAP is a lightweight XML protocol, which can provide both synchronous and asynchronous mechanisms for sending requests between applications. The transport of these XML documents is usually over a lower level network standard, such as TCP/IP.

XML documents need to be valid and well-formed. An XML document is considered to be "well-formed" if it conforms to the particular XML standard. An XML document is considered valid if it complies with a particular schema. At the core of an XML document is an XML parser, which will check to verify that a document is well formed and/or valid.

The processing of XML has become a standard function in many computing environments. When parsing XML, it is necessary to get data from the XML file and transform the data such that the data can be handled by a Java application or other application running the parser. Efficient XML processing is fundamental to the server. As more and more documents become XML based, more and more traffic on the server will be in XML. The latest push into web services (with SOAP as the transport) has also highlighted the fundamental need for fast XML processing. Web services use XML over HTTP as the transport for remote procedure calls. These calls cannot be done in a timely manner if the XML parser is slow. There are primarily two standard approaches for processing XML: (1) SAX, or Simple API for XML, and (2) DOM or Document Object Model. Each protocol has its benefits and drawbacks, although SAX presently has more momentum as an XML processing API.

SAX is an event-based API for parsing XML documents, presenting a document as a serialized event stream. An API, or application programming interface, provides a defined method for developing and utilizing applications. With SAX, a Java application can work with any XML parser, as long as the parser has a SAX driver available. In SAX, an event is generated every time a piece of the XML document is processed. That event is sent to a document handler, which is an object that implements the various SAX handler APIs. Handlers can receive callbacks during the processing of an XML document. Some of the main benefits of this style of XML document processing are that it is efficient, flexible, and relatively low level. It is also possible to change handlers during the processing of an XML document, allowing the use of different handlers for different sections of a document.

One drawback to using a SAX API is that a programmer must keep track of the current state of the document in the code each time an XML document is processed. This may be an unacceptable amount of overhead for XML processing, and may further lead to convoluted document processing code.

Another problem with SAX is that it is necessary to have an event sent to a user. Events cannot be requested as they are needed, but are instead pushed to the user only as the events occur.

DOM, the other standard approach, requires loading an entire XML document into memory and provides a programmer with APIs to be used in manipulating an in-memory tree structure. DOM is a "tree-based" API, as opposed to the event-based SAX. DOM is referred to as "tree-based" because it utilizes a logical structure based on nodes for "branching" through a document. At first glance, DOM might seem like a preferred approach to parsing for an application developer, as the developer does not have to write specific parsing code. This perceived simplicity comes at a price, however, in that performance takes a significant hit. Even for very large documents, the entire document must still be read into memory before taking appropriate actions based on the data. DOM can also be restrictive in how it loads data into memory. A programmer must use a DOM tree as the base for handling XML in the document. This can be too restrictive for most application needs. For example, most application server development descriptors need to be bound to specific Java classes and not DOM trees.

SUMMARY

The present invention overcomes deficiencies with existing XML parsers by presenting systems and methods for efficiently handling XML documents.

Systems and methods in accordance with the present invention expand upon base parsers to provide for the parsing of XML streams generated from an XML document. An iterative method can be built upon a base parser, such as a SAX or DOM parser, which allows the name of a selected element to be passed to the method. The base parser can begin processing the XML document to locate an element tag signifying an element of the XML document. The iterative method can then direct the base parser to step through the elements in the document until the tag is located that corresponds to the selected element. The base parser can extract the selected element from the XML document and process the element such as by generating an event that can be read by a Java application. The event can then be placed on an event stream for use by an application.

DETAILED DESCRIPTION

Systems and methods in accordance with the present invention utilize a streaming API to provide an efficient way of handling XML documents that is uniquely suited to the runtime needs of an application server. A streaming API can be implemented on top of an existing XML parser. This approach can also be referred to as "pull-parsing" or "event-based processing."

A streaming API, or streaming parser, is a mechanism by which a user can request events for an XML document. It is possible to request a bunch of events that will be sent to a particular place and will generate a result object. This is done at a higher level than SAX, and is much more convenient for dealing with XML data.

Such a streaming parser for XML can be implemented, for example, on top of SAX. The streaming parser takes SAX events and constructs an easily manipulated event stream that is available to the application programmer. The streaming parser gives parsing control to the programmer by exposing a simple iteration-based API to the programmer.

In one example, an Iterator API has two methods:
hasNext( ): returns a boolean value, such as "true" if the iteration has more elements
Object( ): returns an object, such as the next element in the iteration This approach allows the programmer to ask for the next event, or pull the next event, rather than handling the event such as in a callback. This gives the programmer more procedural control over the processing of the XML document. The streaming parser also allows the programmer to stop processing the document, skip ahead to specific sections of the document, and/or get subsections of the document as mini DOM trees.

Figure 1:
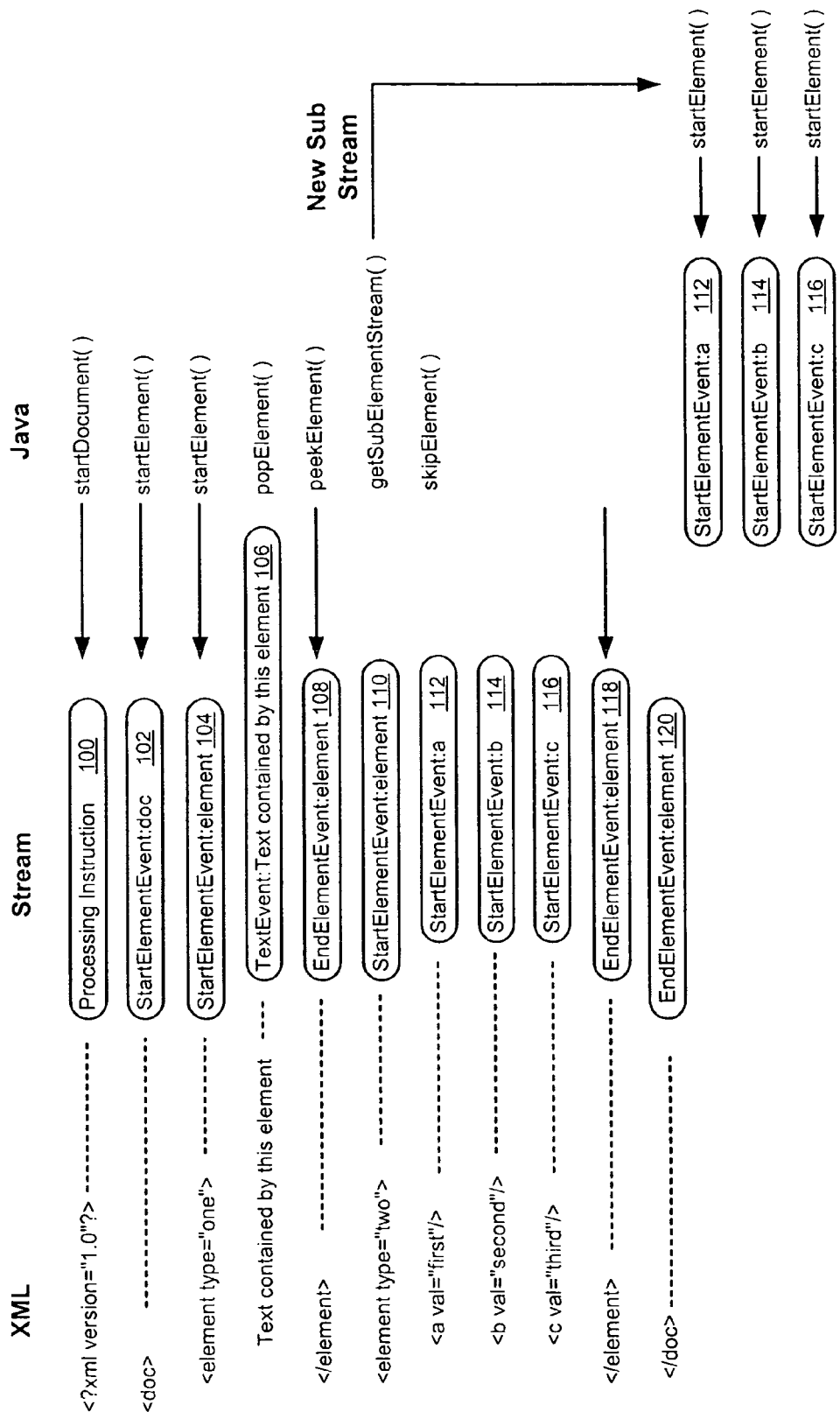
FIG. 1 is a diagram of an event stream with method calls in accordance with one embodiment of the present invention.

FIG. 1 illustrates an event stream, with methods being used to manipulate the current position in the stream. The column on the left represents the XML document, the column on the right represents the Java code, and the column in the middle represents the event stream. In the Figure, the Java method startDocument() is shown to correspond to the Processing Instruction 100 of the event stream, which looks to the header of the XML document. The Java method startElement( ) is called and passed with the event "doc", which corresponds to the StartElementEvent:doc event 102 or the <doc> tag in the XML document. At the first element in the body of the XML document, given here as type "one", a startElement( ) method is again called, but with the element property corresponding to StartElementEvent:element 104 event in the event stream. The text of this element in the XML document is shown as a TextEvent 106 in the event stream. In the XML document, a </element> end tag signifies the end of that element, corresponding to an EndElementEvent 108 in the event stream.

The parser would then reach element type "two" in the XML document, corresponding to another StartElementEvent:element 110 in the event stream. This would generate a substream in the Java environment to handle the second element type. Values 112, 114, 116 of element type "two" are placed onto the event stream and correspond to the Java substream. Element type "two" ends when another end tag is reached in the document, corresponding to an EndElementEvent 118 in the event stream, with another EndElementEvent 120 corresponding to the end of document tag </doc>.

Figure 2:
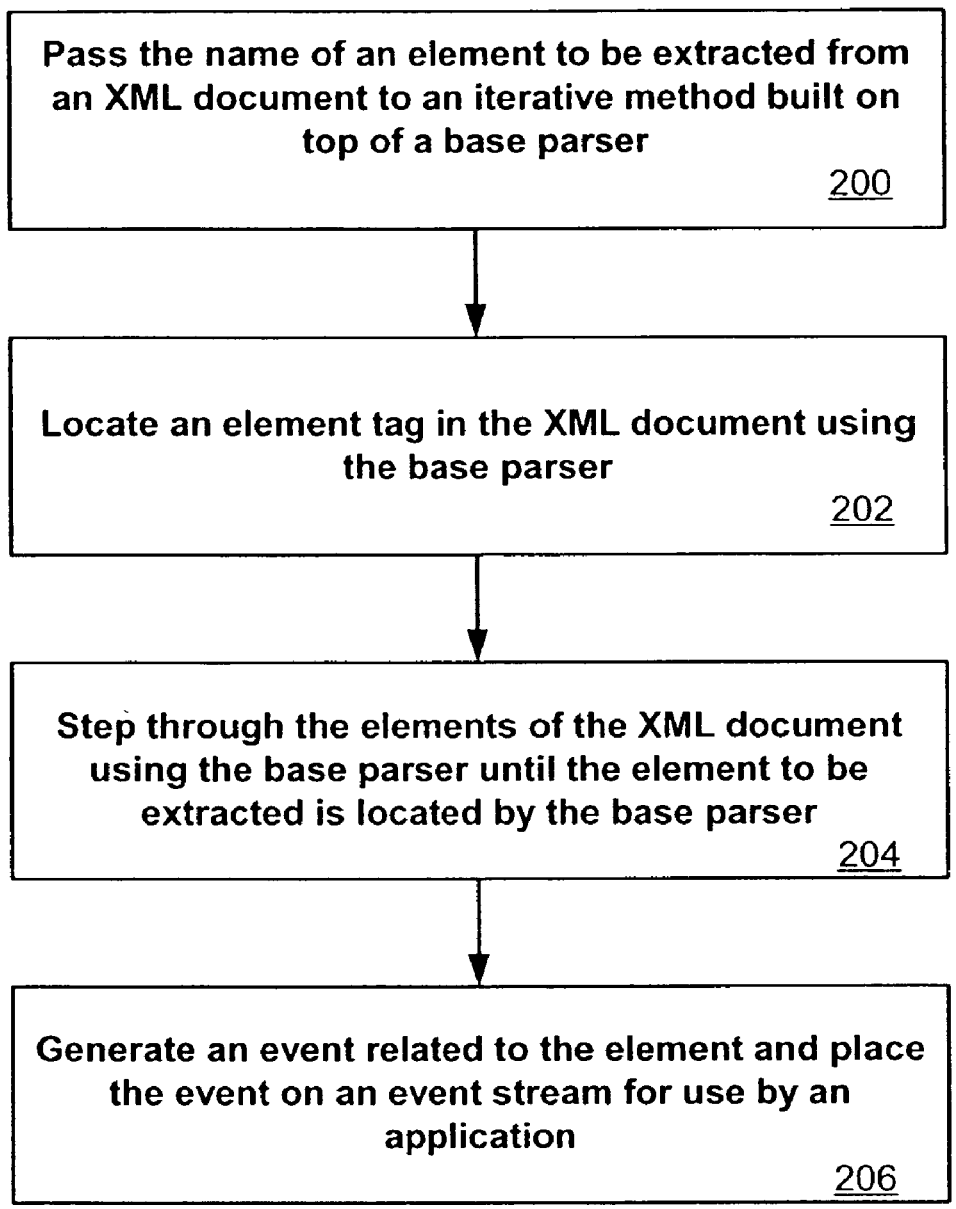
FIG. 2 is a flowchart for an XML processing method in accordance with the present invention.

A method for utilizing such an event stream is shown in FIG. 2. The name of an element to be extracted from the XML document is passed to an iterative method built on top of a base parser, such as a SAX API or DOM parser 200. An element tag of the XML document is located and the element type read by the base parser, without necessarily reading the sub-elements or text of that element 202. The elements of the XML document are then stepped through by the base parser in combination with the iterative method until the element to be extracted is located, read, and processed by the base parser 204. An event is generated, that is related to the element, and placed on an event stream for use by an application such as a Java application 206.

A public access point to an XML processor can take the form of an interface, such as an XMLEventStream interface. A concrete implementation of such an interface or API can be in a class such as an XMLEventStream class. With an event stream, a programmer controls the parser rather than having to write a handler for the parser. For example, the following example program would get all the start elements of a document:

```
import org.xml.sax.Attributes;
import org.xml.sax.InputSource;
import org.xml.sax.SAXException;
import x.xml.stream.XMLEvent;
import x.xml.parsers.XMLEventStream;
import x.xml.stream.XMLEventStream;
import x.xml.stream.XMLEventStream;
import x.xml.stream.StartElementEvent;
import x.xml.stream.EndElementEvent;
import x.xml.stream.TextEvent;
import x.xml.stream.StartPrefixMappingEvent;
import x.xml.stream.ChangePrefixMappingEvent;
import x.xml.stream.EndPrefixMappingEvent;
import x.xml.stream.ProcessingInstructionEvent;
import x.xml.stream.FatalErrorEvent;
public class SimpleParser {
    public static void main (String[] args)
        throws Exception
    {
        XMLEventStream xes = new XMLEventStream( );
        xes.startDocument(new InputSource(args[0]));
        while (xes.hasNext( )) {
            StartElementEvent StartElementEvent =
                (StartElementEvent) xes.startElement( );
            System.out.print(StartElementEvent);
        }
    }
}
```

The stream can be thought of as pointing to different positions in a document. When different methods are called, the methods can manipulate a pointer in the document and return certain information about the elements surrounding that point.

Methods included in such an API can be as follows:

| | |
|---|---|
| void | endDocument(boolean flush) - Stop parsing the document. |
| EndElementEvent | endElement( ) - Consumes the document until you reach an end element. |
| EndElementEvent | endElement(java.lang.String name) - Consumes the document until you reach an end element with local/qname name. |
| EndElementEvent | endElement(java.lang.String name, Java.lang.String namespace) |
| XMLEventStream | getSubElementStream( ) - Create another XMLEventStream starting with the next element and finishing right after. |
| XMLEventStream | getSubStream( ) - Create another XMLEventStream starting with the next element to be parsed. |
| String | getText( ) - Gets the text of the most recently consumed element until you reach the next element. |
| Boolean | hasNext( ) - Determines if there is another event on the queue. |
| Boolean | hasStartElement( ) - Consumes the document until you reach a start element. |
| Boolean | hasStartElement(java.lang.String name) - Consumes the document until a start element is reached with local name equal to name. |
| Boolean | hasStartElement(java.lang.String name, Java.lang.String namespace) - Consumes the document until you reach a start element with local name equal to name and the namespace URI equal to namespace. |
| XMLEvent | next( ) - Pops the next event off the xml event queue and returns it. |
| Boolean | nextElementIs(java.lang.String name) - Compares the next element's local/qname with name. |
| Boolean | nextElementIs(java.lang.String name, Java.lang.String namespace) |
| XMLEvent | peek( ) - Peek the next event on the queue. |
| StartElementEvent | peekElement( ) - Peek the next start element event on the queue. |
| EndElementEvent | popElement( ) - Skip the contents of the current element by consuming events until it reaches an unmatched end element. |
| EndElementEvent | skipElement( ) - Skip the contents of the next element by consuming events until it reaches a matched end element for the starting element. |
| void | startDocument(org.xml.sax.InputSource is) - Start parsing the document. |
| StartElementEvent | startElement( ) - Consumes the document until you reach a start element. |
| StartElementEvent | startElement(java.lang.String name) - Consumes the document until a start element is reached with local/qname name. |
| StartElementEvent | startElement(java.lang.String name, java.lang.String namespace) |

The streaming parser can extend the base parser and expose a single method to the XMLEventStream class. This single method, such as for example streamParseSome( ), can put all the XML events generated by this call onto the stream.

The base parser can be relied upon to handle the guts of the XML processing, forming the base class for all XML processors in the parsing paradigm, including for example the StreamParser and SAXDriver. The base parser iterates over XML Elements, which can then be encapsulated in the Element class. Currently, StreamEvents are created by a factory that accepts Elements and generates events. The same model can be used to create SAXEvents from XML events. The base parser can enforce higher-level well-formedness constraints, such as proper element nesting and proper namespace declaration and scoping.

Such a base parser can have the following methods:
hasNext( ): returns a boolean value, such as "true" if the document has more elements
parseSome( ): returns the next element in the document A scanner can be used to deal with the low-level reading of XML and to generate tokens for the base parser, which consumes the tokens. To a parser, a token is a string of characters that functions as a unit, which is typically as small as possible. The "<?" string that starts a processing instruction and an "if" in a Java program are examples of tokens. The scanner hides the complexity of reading XML from the base parser. The scanner enforces many of the XML specification constraints, such as checking whether characters are valid or elements are well-formed. For instance, a scan( ) method can return the next XML token, and/or can return an end-of-file (EOF) token at the end of the document.

SAX support can also be handled in a SAXDriver class, for example, which can generate SAX events and implement an XMLReader class from SAX.

One streaming parser that can be used in accordance with the present invention is based on a standard API called JAXP, or Java API for XML Processing. JAXP makes it easier to deal with parsing tasks, and makes it possible to handle some vendor-specific tasks. JAXP does not provide parsing functionality, but provides a way to get to XML parsers. The JAXP classes typically sit on top of an existing parser.

The JAXP API can be hooked up to a management system, which can include a console that is accessible to users. The JAXP API can be plugged directly into a configuration system, and can be used to select an XML parser in order to process XML. The selected XML parser reads the XML and converts it into an object that a Java application can read.

JAXP can utilize a SAX protocol comprising a series of callbacks. A "start" callback, for example, can be invoked every time an opening tag is encountered in an XML document by a SAX parser. SAX provides a class called "HandlerBase" that implements the callbacks and provides default implementations of the callback methods. A SAX developer needs to extend the HandlerBase class and implement methods that require the insertion of specific logic. The key is to provide code for these various callbacks, then allow a parser to trigger the callbacks as necessary. The SAX component of JAXP provides a relatively simple way to accomplish this task.

JAXP allows a programmer to provide a parser as a Java system property. In this way, changing the parser being used requires only a change in classpath setting to move from one parser implementation to another. Changing the parser does not require any code recompilation.

The process of dealing with DOM in JAXP is similar to the process of dealing with SAX. As described above, DOM utilizes an in-memory tree structure including nodes to represent elements, attributes, and other XML constructs. With DOM, JAXP does not have to fire callbacks as it does for SAX, instead being responsible only for returning a DOM document object as a result of parsing. DOM methods are similar to SAX methods, except that variations of a parse method do not take an instance of the SAX HandlerBase class, but instead return a DOM Document instance representing the XML document that was parsed.

There are many different XML parsers which can be based on SAX or DOM, and users may want to be able to plug one of these parsers into an application without changing their code. Since the parsers operate using certain minimum standards, JAXP can allow for the addition of one of these parsers by configuring the appropriate mechanisms.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for parsing an extensible markup language (XML) document, comprising:
    associating a base parser with an iterative method running on one or more processors, wherein the iterative method operates to direct the base parser to read the XML document with a plurality of elements;
    stepping, via the iterative method, the base parser through one or more elements in the XML document and generating a first event stream with a first one or more XML events, each XML event associated with one or more elements in the XML document;
    directing, via the iterative method, the base parser to skip a selected element in the XML document in the first event stream;
    generating a second event stream for the selected element, wherein the second event stream includes a second one or more XML events based on one or more sub-elements and attributes within the selected element; and
    allowing the second event stream to be processed separately from the first event stream.

2. A method according to claim 1, further comprising:
    manipulating a pointer inside the XML document.

3. A method according to claim 1, further comprising:
    allowing said base parser to be based on one of a document object model (DOM) application program interfaces (APIs) and a simple API for XML (SAX) APIs.

4. A method according to claim 1, further comprising:
    using a XML processing interface to provide access to said base parser.

5. A method according to claim 1, further comprising:
    using a XML processing interface to select said base parser from a plurality of base parsers.

6. A method according to claim 1, further comprising:
    directing, via the iterative method, the base parser to read only element type of each element in the first event stream and skip sub-elements and text for each element in the first event stream.

7. A system for parsing an extensible markup language (XML) document, comprising:
    one or more microprocessors;
    an iterative method running on the one or more microprocessors, wherein the iterative method is associated with a base parser, and wherein the iterative method is operable to perform:
        directing the base parser to read the XML document with a plurality of elements
        stepping the base parser through one or more elements in the XML document and generating a first event stream with a first one or more XML events, each XML event associated with one or more elements in the XML document;
        directing the base parser to skip a selected element in the XML document in the first event stream;
        generating a second event stream for the selected element, wherein the second event stream includes a second one or more XML events based on one or more sub-elements and attributes within the selected element; and
        allowing the second event stream to be processed separately from the first event stream.

8. A system according to claim 7, wherein:
    said base parser includes a scanner to read the XML document and generate tokens to be processed by the at least one said base parser.

9. A system according to claim 7, further comprising:
    an interface allowing a user to select said base parser from a plurality of base parsers.

10. A system according to claim 7, wherein:
    said base parser supports at least one of SAX APIs and DOM APIs.

11. A system according to claim 7, wherein:
    said base parser is further adapted to convert an event into a JAVA object.

* * * * *